Dec. 30, 1952   D. M. KNOX   2,623,316
VARIABLE COMPOSITE PICTURE FRAME
Filed Jan. 20, 1950   5 Sheets-Sheet 1
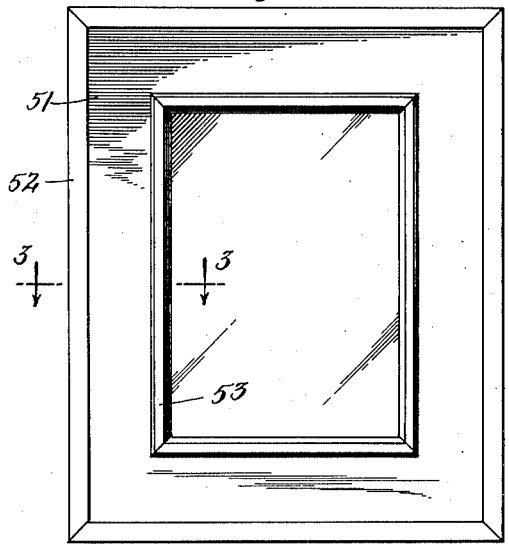
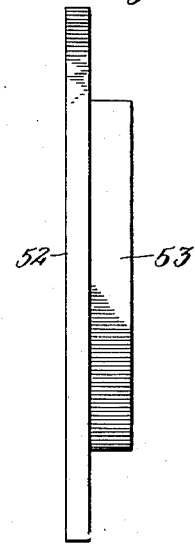
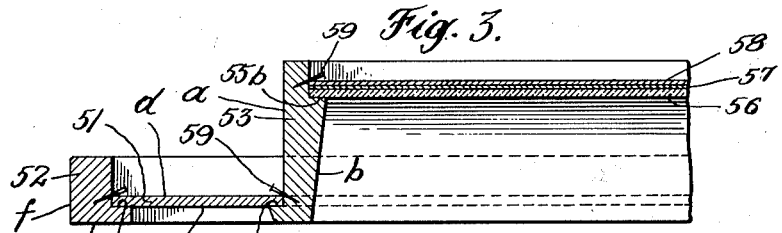
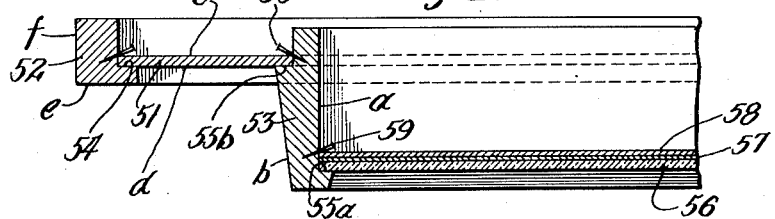
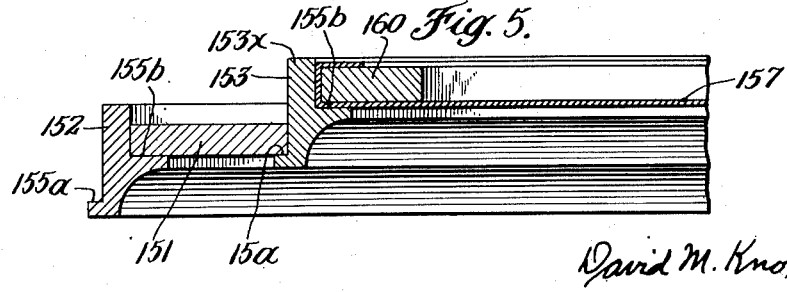
Inventor
David M. Knox
By Synnestvedt & Lechner
Attorneys

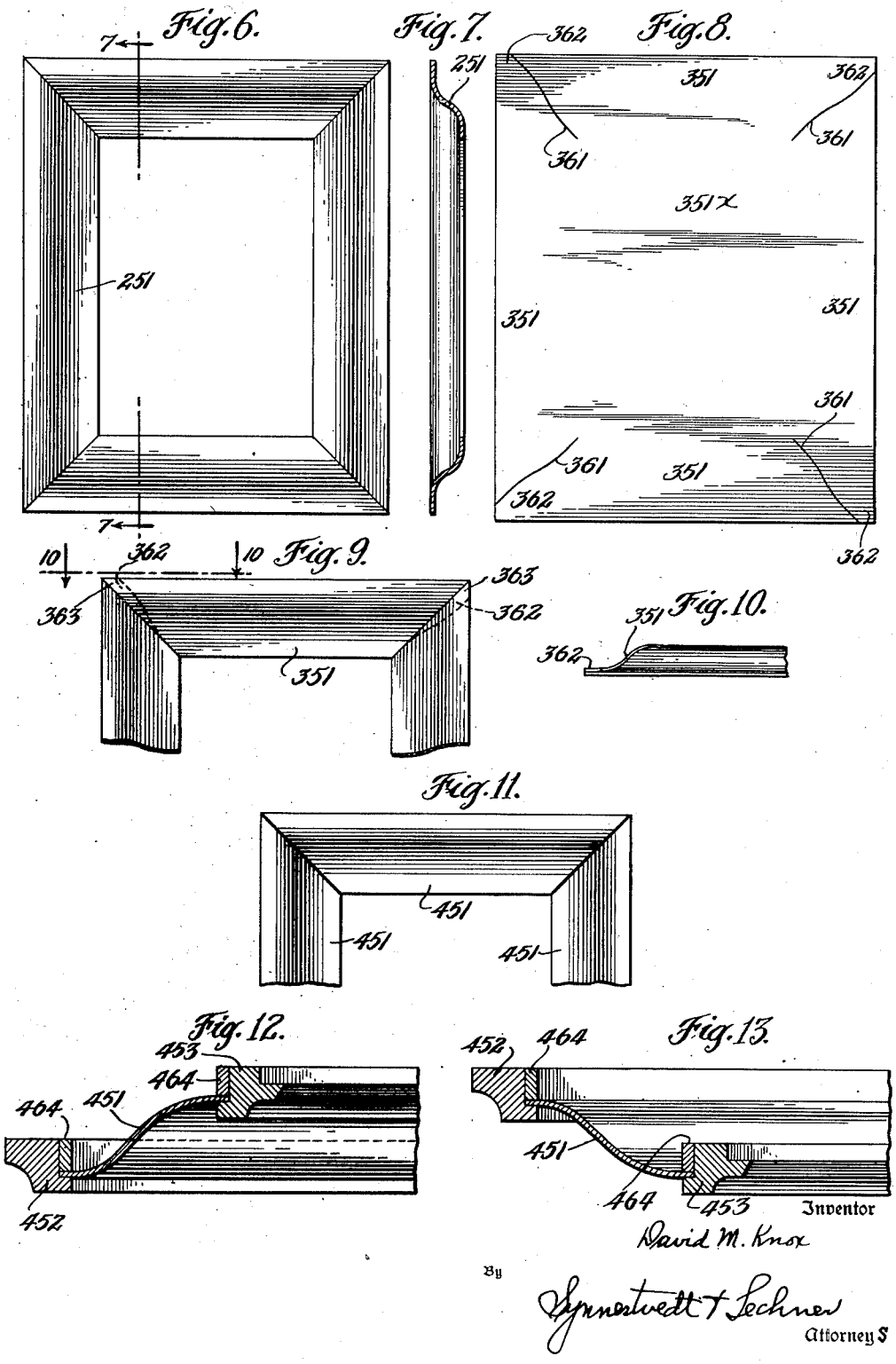

Dec. 30, 1952     D. M. KNOX     2,623,316
VARIABLE COMPOSITE PICTURE FRAME
Filed Jan. 20, 1950     5 Sheets-Sheet 3
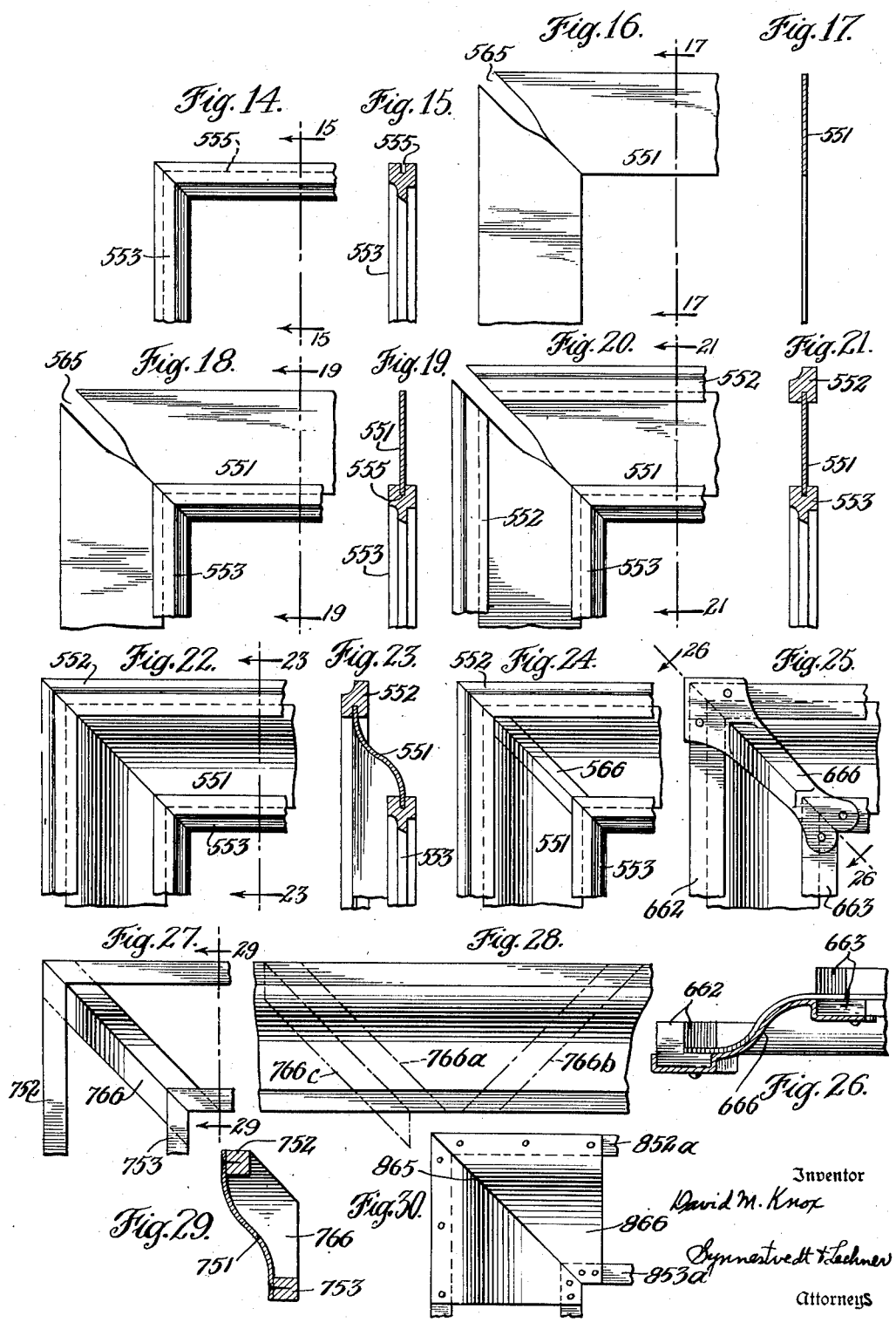

Dec. 30, 1952     D. M. KNOX     2,623,316
VARIABLE COMPOSITE PICTURE FRAME
Filed Jan. 20, 1950     5 Sheets-Sheet 4

Inventor
David M. Knox
By
Hynnestedt & Lechner
Attorneys

Dec. 30, 1952  D. M. KNOX  2,623,316
VARIABLE COMPOSITE PICTURE FRAME
Filed Jan. 20, 1950  5 Sheets-Sheet 5

INVENTOR
David M. Knox
BY
ATTORNEYS

Patented Dec. 30, 1952

2,623,316

UNITED STATES PATENT OFFICE 2,623,316

VARIABLE COMPOSITE PICTURE FRAME

David M. Knox, New York, N. Y.

Application January 20, 1950, Serial No. 139,640

21 Claims. (Cl. 40—152)

This invention relates to variable composite picture frames and more particularly to composite panel-and-molding types of frames of a portable character adapted for the mounting of pictures, mirrors, and the like; and also novel methods of making the same.

In the picture frame art, several well-known types of construction are usually employed, for example: the narrow-molding type, wherein the picture as well as the glass is usually mounted directly in a narrow peripheral molding; the molding-and-mat type, wherein the glass usually extends to the peripheral molding but a wide-frame effect is secured by a mat through the center of which the picture appears; the wide-frame type, wherein the molding itself may be of various substantial widths, these being usually used without a mat, and being characterized by a great deal of individual formation, styling, carving, coloring, etc.; and the shadow-box type, wherein various picture-mounting moldings are in turn mounted within a rather deep box-like exterior frame which latter in turn usually carries an enclosing glass for the whole assembly.

It has also been proposed to make composite frames, formed of an open panel with an outer edge molding, or with such a panel interposed between an inner edge molding and an outer edge molding, and in the latter case it has been customary to fit the picture to the inner edge molding and mount the glass in the outer edge molding.

The major features of my invention lie in the field of the composite panel-and-molding types of frames, and most of the advantages of the invention are most fully attained in the last-mentioned category of that class, i. e. the panel type of frame having inner and outer moldings; although in accordance with the preferred embodiments of my invention the glass does not extend to the outer molding but is mounted in the inner molding, which saves weight and cost and also simplifies the whole assembly.

One of the primary purposes of my invention is to provide great versatility or flexibility in the construction of a wide variety of frames from a relatively small number of components of simple and inexpensive construction. In accordance with this purpose, the invention contemplates the possibility of utilizing one or more standard narrow moldings of very inexpensive materials and construction, in variable association with a panel (likewise of simple and inexpensive construction and material), whereby these elements may form frames of differing contours, color arrangements, sizes and general artistic effects, including, among other things, the provision of differing planar locations for the picture relative to the plane of the outside periphery of the frame.

The invention further contemplates the provision of molding-and-panel members, one or more of which may be inverted in position, altered as to size, or changed as to apparent or actual contour. The invention further contemplates such members which may be pre-formed to the particular sizes or contours desired or which may be cut and/or re-formed to produce such results from certain standard preformed members.

The invention also involves novel bracing elements and novel modes of cutting the same from standard stock.

Still further, the invention contemplates the provision of panel-and-molding members at least one of which has engaging structure associable with the other in two alternative positions of said members relative to each other, whereby to accomplish numerous of the purposes, and obtain certain of the advantages hereinabove and hereinafter set forth.

The invention also contemplates novel methods of making composite picture frames or the like, including novel methods of altering their form and appearance when made, as by the use of deformable panel materials, special formations of them, and manipulating them to form or to alter their contours as a part of the assembly operation or to modify them after assembly; all as will further appear in more detail hereinafter.

How the foregoing general objects and advantages are attained by my invention, together with others which will later appear, will be evident from the following description, taken together with the accompanying drawings, wherein:

Figure 1 is a face view of a typical picture frame constructed in accordance with my invention;

Figure 2 is a right-hand side elevational view of the frame of Figure 1;

Figure 3 is an enlarged plan section taken on the line 3—3 of Figure 1, illustrating typical inner and outer molding members and an intermediate panel member, the inner molding member being in one of its alternative associations with the panel member—this figure also showing the glass, the picture, and the picture backing;

Figure 4 is a section similar to Figure 3, but showing an inversion of the inner molding member relative to the panel member, and a corresponding re-location of the picture, so that the latter projects forwardly from the plane of the periphery of the frame, instead of being recessed therefrom as in Figures 1 to 3;

Figure 5 is a section similar to Figure 3, illustrating a modified construction, wherein the inner and outer molding members are cut from identical stock—this figure also illustrating a stretcher-frame type of picture mounting, and omitting the glass, although a glass may be employed;

Figure 6 is a face view of a molded, pressed, or stamped form of panel member adapted for use with inner and/or outer molding members such as shown in other figures;

Figure 7 is a vertical section taken on the line 7—7 of Figure 6, illustrating the ogee curve to which this panel member has been formed;

Figure 8 is a face view of a sheet of flexible material from which a panel is to be formed, and showing the slightly reversely curved radiating corner slits cut in the sheet for the purpose of making a lap joint, during the subsequent deformation of the peripheral portions of the panel to an ogee (or other) curve;

Figure 9 is a fragmentary face view of a panel made from the sheet of Figure 8, with the peripheral portions bent to a ogee section and fitted with an overlap at the corners, and with the center portion cut out;

Figure 10 is a plan view as indicated by the line 10—10 of Figure 9;

Figure 11 is a fragmentary face view of a panel made up of individual pieces of a plain molded strip of ogee-section, or of a strip which has been bent, stamped or pressed to the desired section;

Figure 12 is an enlarged fragmentary plan section through a panel of any of the types shown in Figures 6, 9 and 11, illustrated in association with inner and outer molding strips of rabbeted type, and associated furring pieces;

Figure 13 is a view similar to Figure 12, showing the identical members, but with the panel inverted, so as to form a convex type of frame instead of a concave type;

Figure 31:
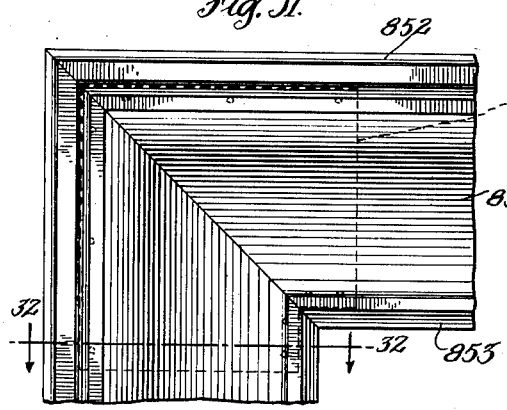
Figure 32:
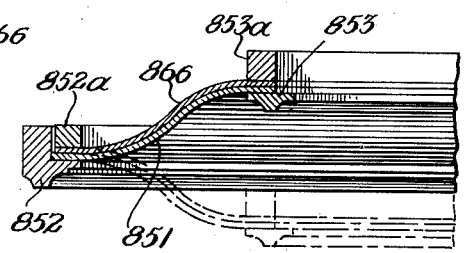
Figure 33:
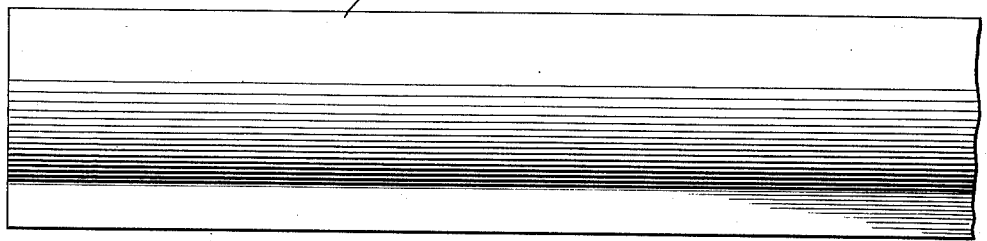
Figures 34, 35, 36, 37:
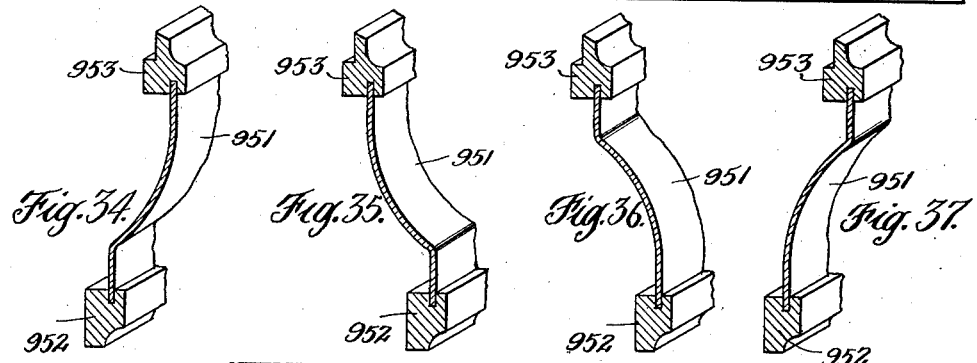
Figure 38:
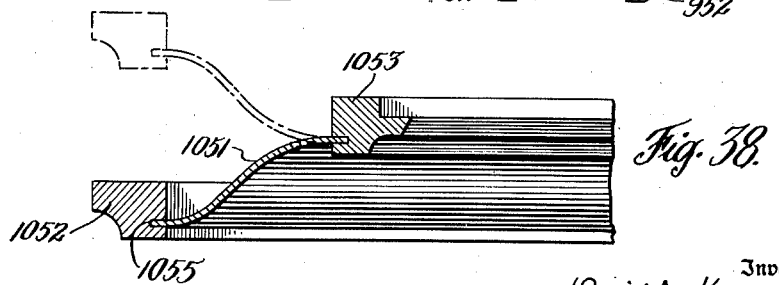
Figure 39:
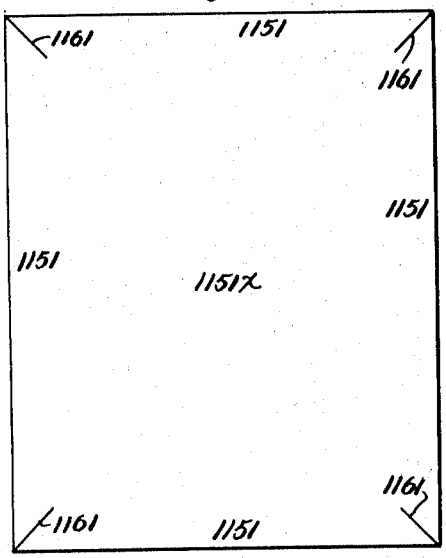
Figure 40:
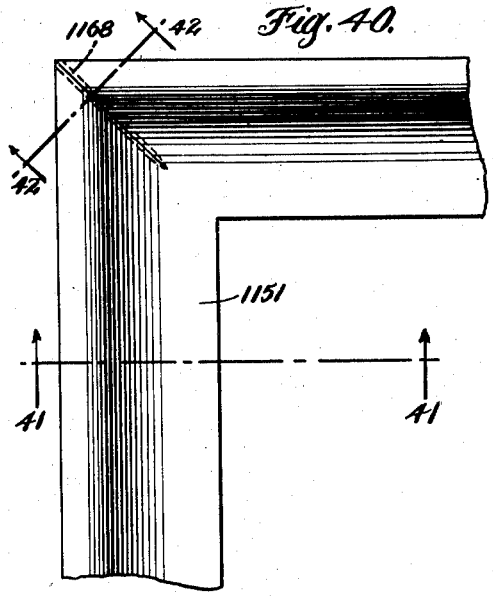
Figure 41:
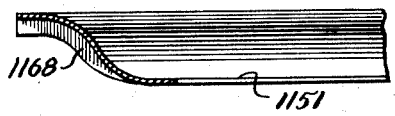
Figure 42:
Figure 43:
Figure 44:
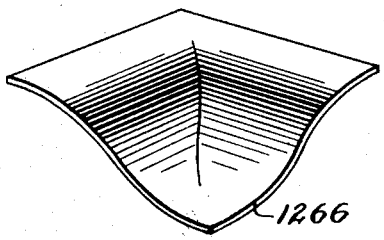
Figure 45:
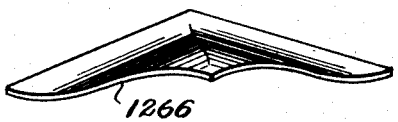

Figures 14 to 23 constitute a series of alternating fragmentary face views and vertical sections illustrating the steps followed, according to one of the methods of the present invention, in constructing a picture frame of the type shown in the final step of Figures 22 and 23—the panel member in these views being, for example, either a resilient material, or else a metal sheeting or other yieldable material adapted to be bent and to take a more or less permanent "set";

Figure 24 is a fragmentary face view illustrating a corner, of the type shown in Figure 22, reinforced by a strip of material, for instance adhesive cloth;

Figure 25 is a similar fragmentary face view of another embodiment of the invention, wherein separately cut panel pieces meet at the corner, and are for example of resilient material, and the desired contour of said pieces and the relative planar positions of the inner and outer molding members are determined and fixed by a rigid, stamped, ornamental corner piece made for example of stiff metal;

Figure 26 is a section taken on the line 26—26 of Figure 25;

Figure 27 is a fragmentary face view illustrating another form of corner construction, with the panel omitted, wherein the inner and outer molding members are of plain square-section pieces, and the corner interbraces between them are formed of a pair of complementary corner members cut from a common piece of molding;

Figure 28 is a face view of a strip of molding from which the corner members of Figure 27 are cut—this view showing how a pair of complementary corner members are cut from such molding and how one of them is thereafter positioned relative to the other in order to form the corner brace of Figure 27;

Figure 29 is a cross-section taken on the line 29—29 of Figure 27 with the panel applied;

Figure 30 is a fragmentary face view of a corner construction embodying supplementary molding strips of plain square-section and flexible pre-cut corner pieces;

Figure 31 is a fragmentary face view of completed framing employing the corner construction of Figure 30;

Figure 32 is a plan section taken on the line 32—32 of Figure 31, showing in full lines the combined assembly of corner construction, main inner and outer moldings, and flexible panel, with the panel and corner reinforcing sheet bent to provide a depressed-center frame, and showing in chain-dotted lines the alternative arrangement of these parts effected by pressing the center of the panel and flexible corner piece forwardly;

Figure 33 is a face view of a molded panel strip, which may be flexible or rigid, but which even if rigid is of a contour which may be used to provide four different frame effects;

Figures 34 to 37 are fragmentary perspective views showing four different types of frame forms which can be provided by employment of the molding panel strip of Figure 33;

Figure 38 is an enlarged fragmentary sectional view illustrating in full and in chain-dotted lines two different forms of frames which can be secured from the embodiment of the invention illustrated in Figures 14 to 23 inclusive, by the use of an acetate or other resilient form of medium for the panel member itself, by which one molding may be pushed through the other (after assembly) to change from a convex to a concave style of frame;

Figure 39 shows a panel which has been slit at the corners, with a plain straight slit (no gusset being cut out), preparatory to shaping, as by being pressed in a pair of dies;

Figure 40 shows the panel member of Figure 39 after cutting out a central area, and after the member has been pressed between dies shaped to press the member into an ogee section;

Figure 41 is a sectional view taken on the line 41—41 of Figure 40, illustrating how the excess material at the corner is pressed downwardly (at the region of slit), for which purpose the lower die may be formed with a slot or groove to receive the downturned edges so formed;

Figure 42 is a section on the line 42—42 of Figure 40, showing how the material at both sides of the slit has been turned down in abutting relation;

Figure 43 is a view similar to Figure 42, but showing the arrangement which results when a plain flat sheet (with no corner slits) is pressed between the ogee dies—this figure as well as Figures 40 to 42 showing how the corner is thereby reinforced;

Figure 44 is an alternative form of reinforcing corner adapted for invertible use with most if not all the forms of panel hereinbefore illustrated; and Figure 45 shows the corner member of Figure 44 in inverted position.

By reference first to Figures 1 to 3, it will be seen that the picture frame of this embodiment comprises three simple elements, namely: a plain flat panel member 51, a narrow outer molding member 52 of a simple standardized stock, and an inner holding member 53 which may occupy two positions relative to the panel member 51.

Member 52 has at its inner edge a seat 54 wherein the outer edge of the panel is mounted. Member 53 has engaging structure associable with the panel member 51, in two alternative positions of said members relative to each other. The said engaging structure, considered as a whole, comprises two seats or shoulders 55a and 55b.

When the portion 55a of the engaging structure is serving as a seat for the panel 51 (as seen in Figure 3) the portion 55b serves as a mounting for the glass 56, picture 57 and backing 58 (as shown) or for a mirror in cases where the frame is used for that purpose.

From Figure 4 it will be seen that the same configuration of molding strip 53, if inverted as compared with the assembly of Figure 3, can be used to provide a projecting type of frame instead of a recessed type, as in Figure 3; the plane of the picture being brought forward of the general plane of the frame or the peripheral molding, instead of lying behind that plane as in Figure 3. In this case the seat 55a cooperates with the glass and picture and the seat 55b with the panel of the frame.

In either assembly, the parts may be held in firm and permanent association by the usual nails 59 or other means.

In addition to the alteration of contour and general appearance of the frame, accomplished by the invertible form of molding strip, as above described, a number of other variations in the appearance of the picture frame and thus in the general effect of the framed picture may be derived from this assembly, by using different colors and/or surface textures on different faces of the several members, which members may be individually inverted to produce a considerable variety of combinations. For instance, different colors, and/or ornamentations, and/or textures may be used on surfaces a and b of molding member 53; differences may be had on the two faces c and d of the panel member 51 (this member being considered as inverted in Figure 4 as compared with Figure 3); and, again, different treatment may be employed with respect to surfaces e and f of the outer molding member 52. The latter member is not shown as inverted in Figure 4, but it will be understood that if it is turned end-for-end and also with the surface f facing forward and the surface e used as the peripheral surface, changes of frame contour and/or color and/or texture and/or ornamental effect may be secured.

Still another change which is readily feasible is to cut the panel member 51 back either at its outer edge, to make the whole frame smaller, or at its inner edge, to make the sectional width of the frame narrower while making the field for the picture larger. Different lengths of the molding strips 52 and 53 must of course be used for the various different assemblies, and the mitered joints of the moldings will be reversely cut when the parts are inverted.

From the above description of Figures 1 to 4, it will be seen that a very large variety of effective frame contours, sizes, styles, colors, finishes, and planar dispositions of the picture, are possible to the artist or picture framer, with but a few items of very simple, standardized materials. It thus becomes unnecessary—for most framework, to carry in stock a large variety of frame components or frame styles; nor is it necessary to do a great deal of special machine or hand work to secure a large variety of artistic results.

Turning now to the construction of Figure 5, it will be seen that this is in some respects even simpler than that of Figures 1 to 4. In this case, the panel 151 is similar to the panel 51, except that it is of a thicker construction and may for example be of wood or wallboard where the panel of Figures 1 to 4 might be of paper, metal, plastic, cardboard, cloth or other materials. The outer molding 152 and the inner molding 153 are in this case made of identical stock, each of these moldings having engaging members 155a and 155b. In the case of the outer molding, only one of the seats thus provided is ordinarily used, although the other serves the purpose of ornamentation. Either or both of the moldings may in this case be inverted end-for-end and/or 180° (viewed in section). Also, the panel 151 may be differently colored or finished on the two opposite faces, as before, and different finishes may be used on the different surfaces of the molding strip. Thus, although but a single form of molding is here used, an even greater variety of frames may be constructed from these elements than from those shown in Figures 1 to 4. In the form of Figure 5, I have illustrated the mounting of the picture 157 by means of a stretcher-frame 160, but the construction of Figure 5 is also suited to a picture assembly such as shown in Figures 3 and 4, and of course the stretcher-frame 160 could be mounted in the arrangements of Figure 3 or Figure 4.

It should also be observed that the depth of the picture frame can readily be altered by planing down or otherwise changing the depth of one or more of the rabbets 155a and 155b of either or both of the moldings. It is also quite possible to alter one of the counterpart moldings, for example the inner molding member 153, to accommodate pictures of different sizes, in a frame of given overall size, for example by cutting off more or less of the portion 153X of the inner molding. If this portion is cut down to the level of the surface 155b of said molding, a picture and/or a stretcher-frame may be run all the way out to the outer molding, in back of the panel member, assuming (for example) that it is not desired in this case to have the entire surface of the picture exhibited. In this case, a picture frame of a standardized size can be used to accommodate or mount different pictures, from time to time, of different sizes.

By reference now to Figures 6 and 7, it will be seen that I have shown an integral pressed or molded panel member 251, which can be very cheaply made in standard sizes, and given any desired sectional contour, such as the ogee contour shown in Figure 7. This panel may have different tinting or finish on front and back surfaces, and may have either surface face out, in association with any of the possible dispositions of an inner molding member or an outer molding member (or both), which members may be of the forms shown in Figures 1 to 4, or Figure 5, or of the rabbeted form shown in Figures 12 and 13, or of the grooved or channel-seated forms shown in subsequent figures. If the panel 251 of Figures 6 and 7 is molded or otherwise formed of a sufficiently stiff material it will be self-sustaining as a portable picture frame (just as in the case of the forms shown in Figures 1 to 5) even with the omission of one of the moldings—for example, the outer molding—while the inner molding is employed as a mounting for the glass, and for purposes of trim.

The panel blank 351X shown in Figure 8 has edge portions 351 which, in the finished frame, show as the panel, whether or not the central portion is cut out. This cutting out may or may not be done, depending upon whether the central portion is desired for purposes of backing and enclosing the picture. Furthermore, the cutting out may be done at any of the various stages of the construction of the frame, or even after the glass and picture have been mounted in the frame. In cases where the middle portion of the blank is not cut out, the glass and picture assembly may itself determine the location of the inner edge of the panel, or an inner molding may be built up and placed right on the flat surface of the panel blank 351X.

Whether or not the internal molding is dispensed with, it is preferred to employ at least the outer molding with the construction of Figure 8. Depending upon the kind of sectional contour desired in the panel portions 351, slits are cut as shown at 361, these being in the present instance of slightly reversed curvature, radiating generally toward the corners, but intersecting the edges at points slightly removed from the corners, so that when the edge portions 351 are shaped, for example, to an ogee curve (as indicated in Figures 9 and 10) there will be small end areas 362 overlapping adjacent side portions of the panel. These may be glued, cemented or otherwise secured in place, and will serve to stiffen the panel at the corners, as well as for making the joint. If an exact registry of edges does not occur at the points 363, the surplus may be easily trimmed off.

Turning now to the form of Figure 11, this is an assembly of several pieces 451, each formed of ogee section (for example, of stiff material), having mitered corners, which, when fitted together, form a panel similar to that shown in Figure 6.

Obviously the panel of Figure 6 or that of Figure 9 or that of Figure 11 may be mounted as shown in Figure 12, or alternatively as shown in Figure 13, with respect to the outer and inner molding members 452 and 453—by merely inverting the panel assembly, so as to secure a general frame appearance which is either concave or convex. In this form, if rigid material is used for the panel structure, the molding members are rabbeted as shown, and the assembly is completed by furring strips 464. Invertibility and differences in coloring of various surfaces of the moldings, as well as the panel, may again be employed to secure variety.

In Figures 14 to 23 I have illustrated one of my novel modes of assembly of a picture frame, which may employ either a panel of a material capable of being readily bent and which when bent will take a more or less permanent "set" (for example certain heavy metal foils or easily bendable but relatively non-resilient sheet metals, or the like), or a panel of a flexible resilient material (such as an acetate sheet or certain flexible plastics or thin metal sheets of a springy character). I will describe the form and method of assembly of Figures 14 to 23 as involving a material adapted to take a "set," and will later describe a similar form but a different method of assembly, with reference to Figure 38, as employing a springy or resilient type of panel; although it will be understood that within limits either method may be employed with either type of material.

Referring further to Figures 14 to 23, the assembly procedure will be readily understood by following these figures in sequence. The inner molding 553 of Figures 14 and 15 is first rigidly secured together to the desired length and width. In the slotted seat 555 thereof is inserted the inner edge of the bendable panel 551. This panel as shown in Figures 16 and 17 may initially be flat and have gussets 565 cut out of the corners so as to provide a true mitered joint when the panel is bent to an ogee form, for example. The assembly of the panel in the slot of the inner molding is shown in Figures 18 and 19.

Figures 20 and 21 show the addition to the parts just mentioned of the outer molding parts 552 before closure of the corners. By revolving the outer molding about the inner molding, as in Figures 21 and 23, the panel is bent to the ogee form shown, and the corner gap (provided by the gusset cut-out) is thus closed up to form a neat mitered joint. The outer molding parts are then securely fastened together at their mitered joints, by staples, nails, gluing, or other conventional means.

The panel corner thus formed may be strengthened and/or covered up by the corner member 556, as shown in Figure 24, which in this instance is simply a strip of heavy adhesive cloth. This can be used to serve the additional purpose of covering any inaccuracies in the mitered joint which may result from the type or form of gusset which has been cut out at the corner; and thus the construction may be cheapened, by virtue of the fact that the gussets do not have to be so accurately laid out and cut to begin with.

A similar construction is illustrated in Figures 25 and 26, except that in this instance the moldings 662 and 663 are two-piece moldings and of modified section. In this case I further show an ornamental stamped stiff metal or other similar corner piece 666. It will also be understood that this type of corner piece lends itself well to the use of acetate or other very resilient panel members, as it tends to hold the panel material as well as the moldings in the desired predetermined shape and relationship, regardless of the resiliency of the panel.

In Figures 27 and 29, I have illustrated another type of corner positioner and reinforcement, 766, which may be made from a milled strip of wood as shown in Figure 28. In this case, complementary pieces 766a and 766b are cut from such a milled strip, and one of said parts is reversed and positioned adjacent to the other, as shown at 766c. These two parts may be glued or otherwise secured together to form the corner brace 766 shown in Figures 27 and 29, and may be rabbeted to engage the plain square-section moldings 752 and 753. The panel piece 751 may be nailed and/or glued to the parts 752, 753 and 766, as shown.

Similar square-section molding members may be used, as in Figure 30, with flexible pre-cut corner sheet members 866, which may if desired be of a bendable material adapted to take a "set," and having a gusset cut out in the region 865, so as to make a mitered joint of the corner reinforcement, as well as of the panel member (not shown in this figure). If desired, the molding members of this assembly may be considered as supplementary molding strips 852a and 853a which, as shown in Figures 31 and 32 may be associated with main molding strips 852 and 853, between which and the supplemental strips the corner stiffeners 866 and the panel 851 are clamped. In the construction of Figures 31 and 32 the stiffened corner is thus concealed from view when the complete frame is assembled. If the corner pieces and the panel member are both made of a material adapted to be bent into desired forms and to take a "set," the same assembly may be initially put together either to form a concave type of frame as shown in full lines in Figure 32, or to form a convex type of frame as shown in chain-dotted lines in that figure. If the panel member is of rather heavy material, such bending to one form or the other would normally be done before the complete assembling of the panel in both moldings.

Figure 33 shows a panel member 951 of irregular section (instead of symmetrical ogee form), which may be made for example of a long strip of molded material, either flexible or rigid, from which the desired panel segments may be cut to any desired size, just as in the case of panel parts 451 of Figure 11. By inversion, end-for-end, and/or in a direction lying in a plane perpendicular to the length of the strip, this one form of molded, pressed or otherwise shaped panel 951 may be placed in four different positions relative to outer and inner molding members 953 and 952 as illustrated in Figures 34 to 37 inclusive—thus giving the possibility of frames of four substantially differing appearances.

Figure 38 shows a construction which is essentially like that of Figures 14 to 23 inclusive, but this figure illustrates the use of a distinctly resilient type of panel material 1051. A different method of assembly may also be used, as follows: The panel member 1051 may first be cut out of a flat sheet, with cut-out gussets at the corners. The inner molding 1053 may then be assembled with relation thereto (at which time the parts would appear as in Figures 18 and 19). The outer molding 1052 may also be assembled and fastened together complete. The highly flexible, resilient panel member 1051 may then be distorted sufficiently to slip into the inner slotted seat 1055 of the outer molding—the outer molding being pressed outwardly or inwardly with relation to the inner molding, as shown respectively in full and chain-dotted lines in Figure 38. The curve taken by the panel 1051 will depend upon the angle at which the slots 1055 are cut in the respective outer and inner moldings. By using a sufficiently yieldable and resilient material for the panel in this form, the frame may be altered at will from a depressed to a projected type, and vice versa, by simply pushing the inner molding backward or forward, as the case may be.

In the construction of Figures 39 to 42 inclusive, I show initially a panel blank 1151X. The side portions 1151 of this sheet have straight slits at the corners, as shown at 1161. The center of this sheet may be cut out as shown in Figure 40, and the remainder of the sheet depressed between dies, one of which has a slot to receive the excess material resulting from the pressing of the panel to an ogee cross-section. This excess material is shown at 1168 in Figures 40 to 42.

Alternatively, the corner slits 1161 may be omitted, in which case the excess material 1168a (Figure 43) will form a strengthening bead at the rear face of the corner of the panel.

An additional strengthening corner member is shown in perspective in Figures 44 and 45. This corner 1266 may be of ogee section, and may be readily reversible. Examples of suitable material for this corner are: stiff copper, stiff molded plastic, more or less hard rubber, etc.

By way of summarizing various features and advantages of the invention, I would point out the following:

First, it will now be evident that the invention provides a great deal of versatility or flexibility of adaptation of relatively simple materials. Thus, variation in frame width is obtained by the use of small, standardized moldings, and varying the proportion and size of the panel. Variation in depth is readily secured by altering the contour of the panel or the thickness or shape of the molding pieces, or the angles of the slots or other seats in the molding pieces, or the depth of rabbeting. By similar operations, adaptability of the frame for oil paintings, water colors, prints, mirrors, etc., is obtained. The adaptability to suit esthetic values in the picture itself, and for the sake of harmony with the surroundings or the decoration of a room, is obtainable by the foregoing features and also by the wide variety of possible coloring, decoration, surface texture, coatings, etc., of the panel member and the molding members.

The cost of the components of the frame is very low, since the moldings may be formed of small and light cross-section, easily fabricated, and joined by conventional means if desired. Likewise, the formation and materials utilized for the panel structure may be of very low cost. As contrasted with carving, inlaying, combing, etc., on conventional frames, the decoration of my novel frames by various surface textures and coatings is much less expensive and more effective. In most forms, the panel structure is light and strong, and in the curved thin forms as well as in the rigid thicker forms the panel lends considerable stiffness to the whole frame, being strongly resistant to warping or distortion; whereas most conventional frames are entirely dependent on the corner fastenings to prevent distortion.

As to weight, my invention reduces the weight as compared with conventional frames of wide form. This is particularly true in the case of large frames, where, in the conventional forms, the moldings must be large, thick and heavy. In addition, the size of the glass, with my arrangements, is kept to a minimum, in most instances, whereas in many conventional types the glass must extend much farther out, which adds to the weight and cost.

The maker of standard frames is thus able to extend his line indefinitely and colorfully, while retaining a simple production plan, without the need for specialists, and without expansion of inventory. The feature framer can obtain the effects he desires, with my built-up frames, without long delays in obtaining special moldings, and at a great reduction in cost.

As to materials employable with my invention, it will be clear that the moldings themselves may be formed of wood, plastics, metal, or other known and suitable materials, and the paneling may be of paper, cardboard, cloth, sheets of sandpaper, of emery-cloth, plywood, wallboard (such as "celotex," "masonite," "beaver-board," "sheet-rock"), stiff or flexible sheets of deformable and/or resilient metal or various plastics or rubber, pre-molded or subsequently pressed, formed, bent, or die-stamped. Decorative treatment for moldings and/or paneling may be by painting, fabric covering, etching, scoring, dipping, spraying, checking, application of luminous material, etc.

In conclusion, it will readily be seen that by my invention it is possible to secure different frontface effects (for example, projection or retraction of the picture plane with relation to the plane of the outer molding), either by deformation of the panel member without inversion of any parts, or by relative inversions of various parts, or by deformation plus inversion, and so on.

I claim:

1. A three-fold, portable, self-sustaining frame for pictures or the like, comprising a panel structure, an inner molding member and an outer molding member, all adapted to cooperate in the alternative production of at least two different front-face effects, said inner member having a seating to receive a picture or the like, and at least one of said members being shiftable relative to said other molding member in a manner to alter the plane of the picture between a substantially projected and a substantially retracted position relative to the plane of the outer molding member.

2. The construction of claim 1, wherein the opposed faces of said panel structure, between said molding members, have different facial characteristics.

3. The construction of claim 1, wherein said panel structure is of yielding material to permit such shifting.

4. The construction of claim 1, wherein at least one of said molding members has seats on opposite edges located in different planes, whereby shifting may be accomplished by transposition of certain of the molding members.

5. The construction of claim 1, wherein the inner and outer molding members are of counterpart section.

6. The construction of claim 1, wherein the outer molding is assembled from molding members so configured that the outer molding as a whole may be inverted face-for-face relative to the panel structure.

7. The construction of claim 1, wherein the outer molding member and the panel structure are so configured that the assembly thereof may be inverted face-for-face relative to the inner molding member.

8. The construction of claim 1, wherein said panel structure has opposed finished faces alternatively disposable toward the front and further has a cross-sectional contour comprising a sloping intermediate portion, and inner and outer marginal seating portions located in substantially spaced-apart planes and cooperative with the respective molding members, at least one such marginal seating portion being configured to seat on the cooperating molding member in either of two relatively-inverted positions, the panel structure thus being invertible face-for-face with reference to at least one of said molding members whereby to effect the shifting of one molding member relative to the plane of the other, so as to effect substantial projection or retraction of picture location relative to the latter plane.

9. The construction of claim 8, wherein said panel structure comprises an integral rectangular member pressed from a sheet of deformable material to the said cross-sectional contour, with resultant surplus material at the corners gathered and forced out of the general contour of said member to provide stiffening corner ribs projecting from one face thereof and true mitre-joint lines at the opposite face.

10. A frame for pictures and the like comprising an outer molding member in one general plane, an inner molding member in another general plane, and a panel member extending from one of said members to the other and constructed of material so deformable as to enable relative inversion of the planes of the two molding members.

11. The construction of claim 10, wherein the panel member is of deformable resilient material.

12. The frame of claim 10, wherein the construction embodies resilient material adapting the frame for the said relative inversion by snapping the inner molding through from a plane in front of the plane of the outer molding to a plane rearward of the plane of the outer molding, such resilient material serving also to stiffen the assembly, in either position of inversion.

13. The construction of claim 12, wherein said resilient material constitutes the panel member.

14. The construction of claim 12, wherein said resilient material is in the form of supplemental sheeting serving to brace the panel member.

15. A frame for pictures and the like comprising an outer molding member in one general plane, an inner molding member in another general plane, a panel member constructed of material so deformable as to enable relative inversion of the planes of said molding members, means securing the outer edge portions of the panel member to said outer member, means for securing the inner edge portions of the panel member to said inner molding member, said inner molding member having means for carrying a picture, said inner and outer molding members being constructed to hold the inner and outer edge portions of the panel member in parallel planes notwithstanding relative inversion of the planes of said molding members, whereby reversed ogee curves of said panel member accompany said inversions.

16. A frame for pictures and the like according to claim 15, together with stiffeners traversing the space between the inner and outer molding members, said stiffeners being configured to hold the panel member to the desired ogee curve.

17. A composite picture frame or the like comprising an outer member of rigid construction, an inner member of rigid construction, an intermediate panel member marginally seated on said inner and outer members, said inner member having means for carrying a picture, and said panel member being of relatively yielding construction as compared with said inner and outer members so as to be capable of flexure after assembly whereby to project or retract the exhibition plane of the picture from the plane of the outer member.

18. A composite picture frame or the like according to claim 17, together with rigid corner members for fixing the profile of the panel member in the selected flexed position.

19. A picture frame comprising a relatively wide panel member and a relatively narrow molding member, both disposed peripherally of the picture site, one of said members having a seat for a picture, said molding member being of relatively rigid material and said panel member being of relatively yielding and deformable but resilient material and having a sectional contour curving away from the plane of the picture and being sufficiently resilient to maintain a position of projected or retracted curvature relative to the molding.

20. For picture framing and the like, the combination of a molding member having seating means and a panel member seatable thereon, said panel member being of irregular cross-section but with similar opposed seating edges and being invertible in the seating means on said molding member end-for-end and also back-to-front, whereby its four possible inversions produce, in combination with said molding member, four different effective frame contours.

21. A frame for pictures and the like comprising an outer molding member, an inner molding member, and an intermediate panel member seatable on both molding members, said panel member being of irregular cross-section but with similar opposed seating edges and being invertible in said molding members end-for-end and also back-to-front, whereby its four possible inversions produce four different effective frame contours.

DAVID M. KNOX.

REFERENCES CITED

The following references are of record in the file of this patent:

UNITED STATES PATENTS

| Number | Name | Date |
|---|---|---|
| 166,962 | Bradford | Aug. 24, 1875 |
| 316,715 | Woelfle | Apr. 23, 1889 |
| 488,630 | Hafely | Dec. 27, 1892 |
| 561,075 | Furrell | May 26, 1896 |

FOREIGN PATENTS

| Number | Country | Date |
|---|---|---|
| 369,464 | France | Jan. 12, 1907 |
| 3,382 | Great Britain | Feb. 10, 1912 |
| 120,813 | Austraila | Jan. 10, 1931 |